(12) United States Patent
Bostick et al.

(10) Patent No.: US 11,301,526 B2
(45) Date of Patent: Apr. 12, 2022

(54) SEARCH AUGMENTATION SYSTEM

(71) Applicant: Kyndryl, Inc., New York, NY (US)

(72) Inventors: James E. Bostick, Cedar Park, TX (US); Danny Yen-Fu Chen, Austin, TX (US); Sarbajit K. Rakshit, Kolkata (IN); Keith R. Walker, Austin, TX (US)

(73) Assignee: Kydryl, Inc., New York, NY (US)

( * ) Notice: Subject to any disclaimer, the term of this patent is extended or adjusted under 35 U.S.C. 154(b) by 410 days.

(21) Appl. No.: 15/985,965

(22) Filed: May 22, 2018

(65) Prior Publication Data

US 2019/0362023 A1     Nov. 28, 2019

(51) Int. Cl.
| | |
|---|---|
| *G06F 16/00* | (2019.01) |
| *G06F 16/9535* | (2019.01) |
| *G06F 16/901* | (2019.01) |
| *G06F 16/903* | (2019.01) |
| *G06Q 50/00* | (2012.01) |

(52) U.S. Cl.
CPC ........ *G06F 16/9535* (2019.01); *G06F 16/902* (2019.01); *G06F 16/90335* (2019.01); *G06Q 50/01* (2013.01)

(58) Field of Classification Search
CPC ............... G06F 16/9535; G06F 16/902; G06F 16/90335; G06Q 50/01; G06Q 30/02
See application file for complete search history.

(56) References Cited

U.S. PATENT DOCUMENTS

| | | | |
|---|---|---|---|
| 9,317,574 B1 | 4/2016 | Brisebois et al. | |
| 2009/0306967 A1 | 12/2009 | Nicolov et al. | |
| 2009/0307177 A1* | 12/2009 | Tirpak | H04L 67/14 706/53 |
| 2011/0106895 A1* | 5/2011 | Ventilla | H04L 12/66 709/206 |
| 2012/0209832 A1* | 8/2012 | Neystadt | G06F 16/9535 707/723 |
| 2012/0296845 A1 | 11/2012 | Andrews et al. | |
| 2014/0122522 A1* | 5/2014 | Ganapathy | G06Q 10/101 707/769 |
| 2014/0136518 A1 | 5/2014 | Shum et al. | |
| 2014/0279998 A1* | 9/2014 | Blumenfeld | G06F 16/2453 707/706 |
| 2014/0289261 A1 | 9/2014 | Shivakumar | |
| 2016/0092586 A1 | 3/2016 | Ickman et al. | |
| 2016/0203140 A1 | 7/2016 | Paul | |
| 2016/0342902 A1* | 11/2016 | Pinckney | G06F 16/2457 |

* cited by examiner

*Primary Examiner* — Ashish Thomas
*Assistant Examiner* — Suman Rajaputra
(74) *Attorney, Agent, or Firm* — Yee & Associates, P.C.

(57) ABSTRACT

A method, apparatus, system, and computer program product for processing a query received through a network. A computer system identifies a topic in the query. The computer system identifies a set of friends of a user from a set of social media networks in which the set of the friends have an expertise in the topic identified in the query. The computer system ranks the set of the friends based on a level of the expertise of the set of the friends for the topic and an availability of the set of the friends to form a ranked set of the friends. The computer system returns results that contain the ranked set of the friends for the topic.

10 Claims, 7 Drawing Sheets

SEARCH AUGMENTATION SYSTEM

BACKGROUND

1. Field

The present disclosure relates generally to an improved computer system and, more specifically, to a method, an apparatus, a system, and a computer program product for processing a query received in a network data processing system to augment search results with experts.

2. Description of the Related Art

With the Internet, vast amounts of information is available to users from hardware devices such as computers, tablets, mobile phones, and other types of data processing systems. Users may search for information with these devices by sending queries to search engines. A search engine is a software system designed to search for information on the Internet, such as on the World Wide Web.

When a user desires information about a topic, the user may enter a query in a browser running on a data processing system in which the query is sent to a search engine. The search engine returns search results that are displayed on the browser. The search results for the topic may include links to a mix of webpages, images, documents, videos, or other types of files.

Depending on the topic and the manner in which the query is phrased, the search results may include thousands or hundreds of thousands of results. Many of these results may contain information that is irrelevant or less relevant than desired for the topic of interest to the user. Attempting to review all or a large portion of the results returned may be infeasible or too time-consuming for the user. The user may revise the query in an attempt to reduce the number of results and return more relevant results. In some cases, the user may be unable to revise the query in a manner that returns a small enough number of results containing relevant information for review.

Therefore, it would be desirable to have a method and apparatus that take into account at least some of the issues discussed above, as well as other possible issues. For example, it would be desirable to have a method and apparatus that overcome a technical problem with obtaining manageable amounts of relevant information about a topic of interest when searching for information on a network such as the Internet.

SUMMARY

According to one embodiment of the present invention, a method processes a query received through a network. A computer system identifies a topic in the query. The computer system identifies a set of friends of a user from a set of social media networks in which the set of the friends have an expertise in the topic identified in the query. The computer system ranks the set of the friends based on a level of the expertise of the set of the friends for the topic and an availability of the set of the friends to form a ranked set of the friends. The computer system returns results that contain the ranked set of the friends for the topic.

According to another embodiment of the present invention, a search augmentation system comprises a computer system and an expert identifier. The expert identifier runs on the computer system and identifies a topic in a query. The expert identifier identifies a set of friends of a user from a set of social media networks in which the set of the friends have an expertise in the topic identified in the query and ranks the set of the friends based on a level of the expertise of the set of the friends for the topic and an availability of the set of the friends to form a ranked set of the friends. The expert identifier returns results that contain the ranked set of the friends for the topic.

According to yet another embodiment of the present invention, a computer program product for processing a query received through a network is present. The computer program product comprises a computer-readable storage media with first program code, second program code, third program code, and fourth program code stored on the computer readable storage media. The first program code is for identifying a topic in the query. The second program code is for identifying a set of friends of a user from a set of social media networks in which the set of the friends have an expertise in the topic identified in the query. The third program code is for ranking the set of the friends based on a level of the expertise of the set of the friends for the topic and an availability of the set of the friends to form a ranked set of the friends. The fourth program code is for returning results that contain the ranked set of the friends for the topic.

DETAILED DESCRIPTION

Figure 1:
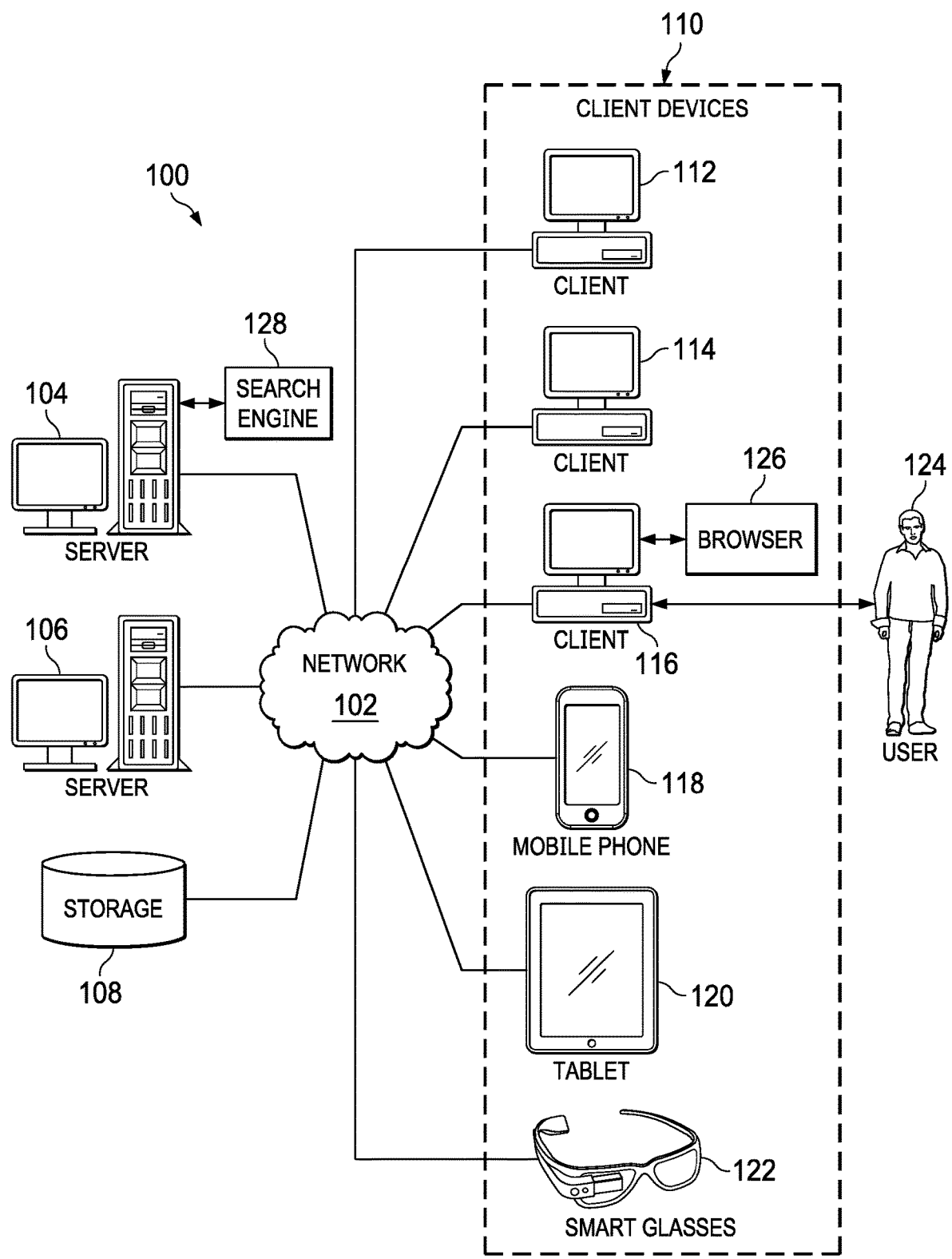
FIG. 1 is a pictorial representation of a network of data processing systems in which illustrative embodiments may be implemented.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that current techniques for processing queries often return search results that are much larger in number than may be feasible for a user to review. The illustrative embodiments recognize and take into account that many of the search results may address the topic about which the user desires information. The illustrative embodiments recognize and take into account that it would be desirable to reduce at least one of the number of results or the number of irrelevant results.

Thus, the illustrative embodiments provide a method, an apparatus, a system, and a computer program product for processing a query received through a network. In one illustrative example, a computer system identifies a topic in the query. The computer system identifies a set of friends of a user from a set of social media networks in which the set of the friends have an expertise in the topic identified in the query. The computer system ranks the set of the friends based on a level of the expertise of the set of the friends for the topic and an availability of the set of the friends. The computer system returns results that contain a ranked set of the friends for the topic. As used herein, a "set of," when used with reference to items, means one or more items. For example, a set of friends is one or more friends.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 may be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, some or all of client devices 110 may form an Internet of things (IOT) in which these physical devices can connect and exchange data.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 may be stored on a computer recordable storage medium and downloaded to a data processing system or other device for use. For example, program code may be stored on a computer recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 may be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference items, means one or more items. For example, "a number of different types of networks" is one or more different types of networks.

Further, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In one illustrative example, user 124 operates a client device in client devices 110 to obtain information on a topic. For example, user 124 may operate client computer 116 and generate a query for a topic using browser 126 running on client computer 116. Browser 126 is a software application used to access information within network data processing system 100, which may include the World Wide Web.

In this example, browser 126 sends the query to search engine 128 running on server computer 104. Search engine 128 returns results to browser 126, which are displayed to user 124. In this illustrative example, search engine 128 operates to identify a set of friends of user 124 that have an expertise in the topic of interest to user 124 in the query.

For example, user 124 may enter a query searching for information about hiking in the mountains. In this example, the topic is mountain hiking. Search engine 128 returns results containing information about this topic. These results include webpages, images, videos, or other types of information. Additionally, search engine 128 also may include a set of friends of user 124 that have an expertise in mountain hiking.

In this illustrative example, the set of friends of user 124 are ranked based on a level of expertise. The ranking also may be based on an availability of the set of friends. In this manner, user 124 may consult with one or more of the set of friends to obtain information about mountain hiking in a more efficient manner in contrast to reviewing websites, documents, images, or other information returned in the search results. Although shown running on server computer 104, search engine 128 may be distributed and run on other data processing systems, such as server computer 106 or other data processing systems that are not shown in network data processing system 100.

Figure 2:
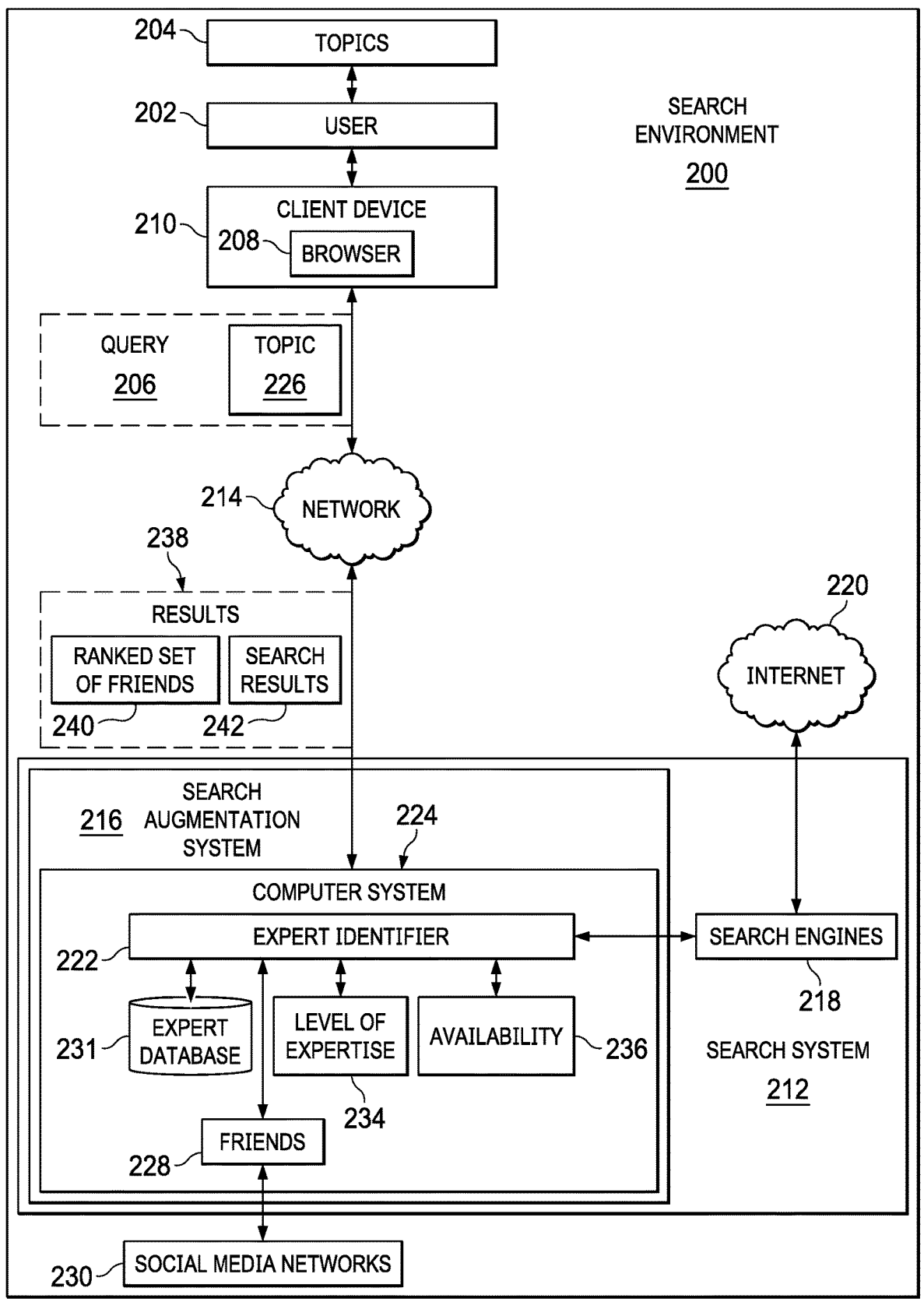
FIG. 2 is a block diagram of a search environment in accordance with an illustrative embodiment.

With reference now to FIG. 2, a block diagram of a search environment is depicted in accordance with an illustrative embodiment. In this illustrative example, search environment 200 includes components that can be implemented in hardware, such as the hardware shown in network data processing system 100 in FIG. 1.

In this illustrative example, search environment 200 is an environment in which user 202 can search for information on topics 204. As depicted, user 202 enters query 206 into browser 208 running on client device 210 to obtain information about topic 226 in topics 204.

Query 206 is at least one of a term or a phrase used to obtain information about topic 226. Client device 210 may take a number of different forms. For example, client device 210 is a hardware device and may be selected from one of a desktop computer, a workstation, a tablet computer, a mobile phone, smart glasses, a kiosk, a set-top box, or some other suitable device that includes one or more processor units for processing data.

In this illustrative example, query 206 is sent from client device 210 to search system 212 over network 214. In this illustrative example, search system 212 includes a set of search engines 218 and search augmentation system 216. The set of search engines 218 is configured to search for information on Internet 220.

As depicted, search augmentation system 216 comprises expert identifier 222 running on computer system 224. Computer system 224 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

As depicted, expert identifier 222 operates to identify topic 226 in query 206. Expert identifier 222 identifies a set of friends 228 of user 202 from a set of social media networks 230. In this example, the set of friends 228 of user 202 that has an expertise for topic 226 can be identified by expert identifier 222 using expert database 231.

Expert database 231 contains information identifying friends 228 of user 202 from the set of social media networks 230, topics of expertise for friends 228, and levels of expertise of friends 228 for topics 204. The set of friends 228 is one or more of friends 228 that are able to best assist user 202 on topic 226. These friends are experts for topic 226 because they are identified as able to assist user 202 in providing information about topic 226.

In this illustrative example, expert identifier 222 ranks the set of friends 228 based on level of expertise 234 of the set of friends 228 for topic 226 and availability 236 of the set of friends 228. The ranking forms ranked set of friends 240.

In this illustrative example, expert identifier 222 returns results 238 that contains ranked set of friends 240 for topic 226. In this illustrative example, expert identifier 222 receives search results 242 from the set of search engines 218 for query 206. Expert identifier 222 may return results 238 that contain ranked set of friends 240 and search results 242.

Expert identifier 222 may be implemented in software, hardware, firmware or a combination thereof. When software is used, the operations performed by expert identifier 222 may be implemented in program code configured to run on hardware, such as a processor unit. When firmware is used, the operations performed by expert identifier 222 may be implemented in program code and data and stored in persistent memory to run on a processor unit. When hardware is employed, the hardware may include circuits that operate to perform the operations in expert identifier 222.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In the illustrative example, one or more technical solutions are present that overcome a technical problem with obtaining manageable amounts of relevant information about a topic of interest when searching for information on a network, such as the Internet. As a result, one or more technical solutions may provide a technical effect reducing the number of search results that user 202 may have to review to obtain information on a desired topic. One or more technical solutions provides a technical effect in which a set of friends 228 are identified for user 202 that can be consulted by user 202 on the desired topic.

As depicted, expert identifier 222 uses multiple sources to identifies friends 228 of user 202 who are knowledgeable on topics 204. Expert identifier 222 identifies a set of friends 228 that are able to best assist user 202 with respect to topic 226. The set of friends 228 are also identified based on availability 236. For example, the set of friends 228 are able to provide information on topic 226 within a time frame desired by user 202.

As a result, computer system 224 operates as a special purpose computer system in which expert identifier 222 in computer system 224 enables facilitating quicker access to information about topic 226. In particular, expert identifier 222 transforms computer system 224 into a special purpose computer system as compared to currently available general computer systems that do not have expert identifier 222.

Figure 3:
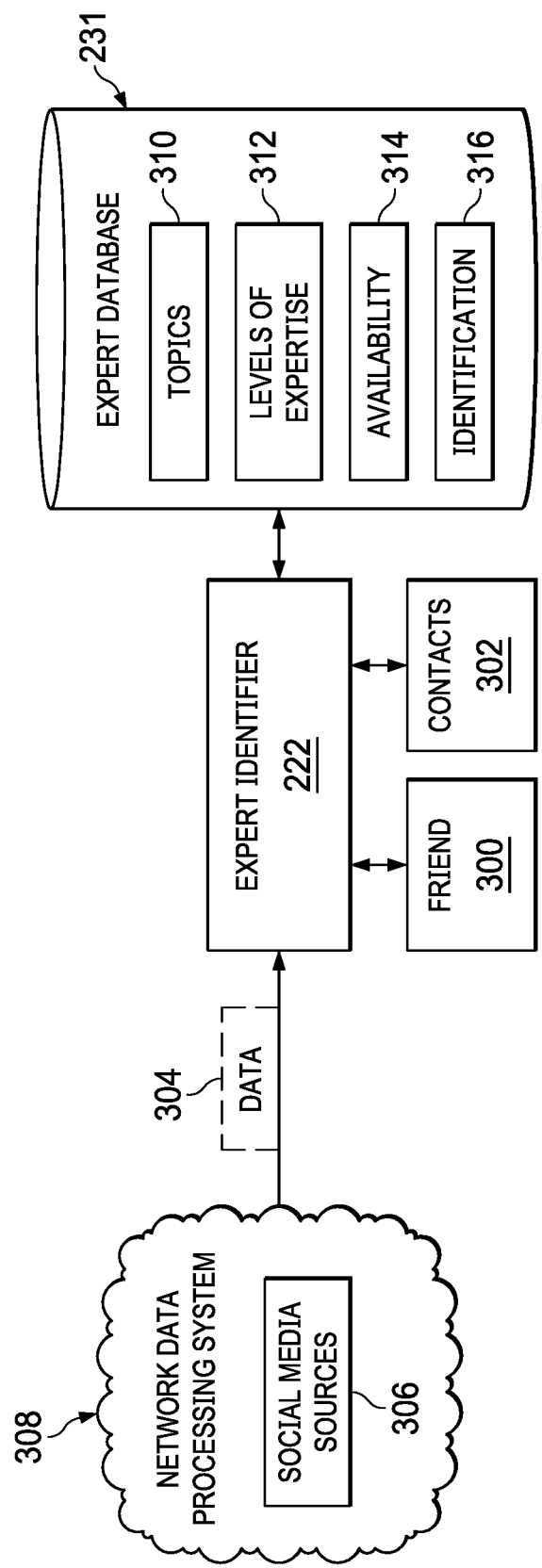
FIG. 3 is a dataflow diagram for identifying friends who are experts on topics in accordance with an illustrative embodiment.

With reference now to FIG. 3, a dataflow diagram for identifying friends who are experts on topics is depicted in accordance with an illustrative embodiment. In the illustrative examples, the same reference numeral may be used in more than one figure. This reuse of a reference numeral in different figures represents the same element in the different figures.

In this figure, expert identifier 222 searches for friends 228 of user 202 who are experts for topics 204. The identification of friends 228 and information about their expertise on topics 204 are stored in expert database 231.

During operation, expert identifier 222 identifies friend 300 of user 202. Friend 300 can be identified from various sources. Friend 300 is someone with which user 202 has a connection through at least one of social media sources 306, real life, work, or other organizations or activities.

In this example, friend 300 is identified from contacts 302 for user 202 in social media networks 230. User 202 may give expert identifier 222 permissions to access contacts of user 202. In other illustrative examples, user 202 may upload contacts for friends 228. Friend 300 can also be identified from contacts 302 in an email system, an instant messaging system, a mobile phone, or other sources in which contact information may be present for user 202.

Expert identifier 222 is used to determine whether friend 300 is already present in expert database 231 for user 202. If friend 300 is not already in expert database 231, expert identifier 222 obtains data 304 about friend 300. For example, expert identifier 222 obtains data 304 about friend 300 from social media sources 306 on network data processing system 308. Data 304 can be obtained using different mechanisms.

For example, expert identifier 222 can initiate searches on network data processing system 308. Network data processing system 308 can be, for example, at least one of the Internet, an intranet, a local area network, or some other suitable type of network. Expert identifier 222 can also use web crawlers or spiders to search for data 304 about friend 300.

As depicted, data 304 can take different forms. The data can include at least one of a profile of friend 300 from a social media network, a rating of friend 300 from a forum, a posting on the social media network, a blog entry by or about friend 300, a conversation, an article published by or about friend 300, a review of friend 300, an indication of whether a comment or review by friend 300 is useful, a presentation authored by friend 300, a message conversation in which friend 300 is an participant, a resume for friend 300, or some other type of data that can be used to identify a set of topics 310 of expertise for friend 300 and levels of expertise 312 for the set of topics 310.

From data 304, expert identifier 222 identifies levels of expertise 312 on which friend 300 is an expert. Additionally, expert identifier 222 also identifies a set of levels of expertise 312 for each of the set of topics 310. In this example, a level of expertise in the set of levels of expertise 312 is assigned to each topic in the set of topics 310 for friend 300.

Further, data 304 also can be to use to determine availability 314 of friend 300. Expert identifier 222 updates expert database 231 to include identification 316 of friend 300, a set of topics 310, a set of levels of expertise 312, and availability 314.

This determination of availability 314 can be made in a number of different ways. For example, expert identifier 222 may utilize an artificial intelligence system to determine how soon information is desired on topic 226. Expert identifier 222 can utilize natural language processing to analyze the wording in query 206 to determine a time frame for when information about topic 226 is needed.

The artificial intelligence system is a system that is based on a function of the human brain. An artificial intelligence system comprises at least one of a neural network, a cognitive system, a Bayesian network, fuzzy logic, an expert system, a natural language system, a cognitive system, or some other suitable system. A cognitive system is a computing system that mimics the function of a human brain. The cognitive system can be, for example, IBM Watson available from International Business Machines Corporation.

For example, wording of query 206 can be analyzed to determine the urgency of query 206. As another example, an identification of words such as "birthday" and "Sue" can be used to identify a birthday for a friend of user 202 named Sue. That date can be used to determine the time frame for when the information about topic 226 is needed. As another example, a phrase such as "how to remove virus" may indicate an urgency in obtaining information on topic 226. Thus, expert identifier 222 can identify how soon information is needed on topic 226 as at least one of a level of urgency, a timeframe, or some other suitable manner to determine how soon information about topic 226 is desired by user 202.

Thus, expert identifier 222 provides more than a simple profile for friend 300. By using expert database 231, expert identifier 222 can provide results to queries from user 202 more quickly than having to search for this information when a query is received. Further, the result can be friend 300 who is an expert on a topic of interest and available within a time frame needed by user 202.

Figure 4:
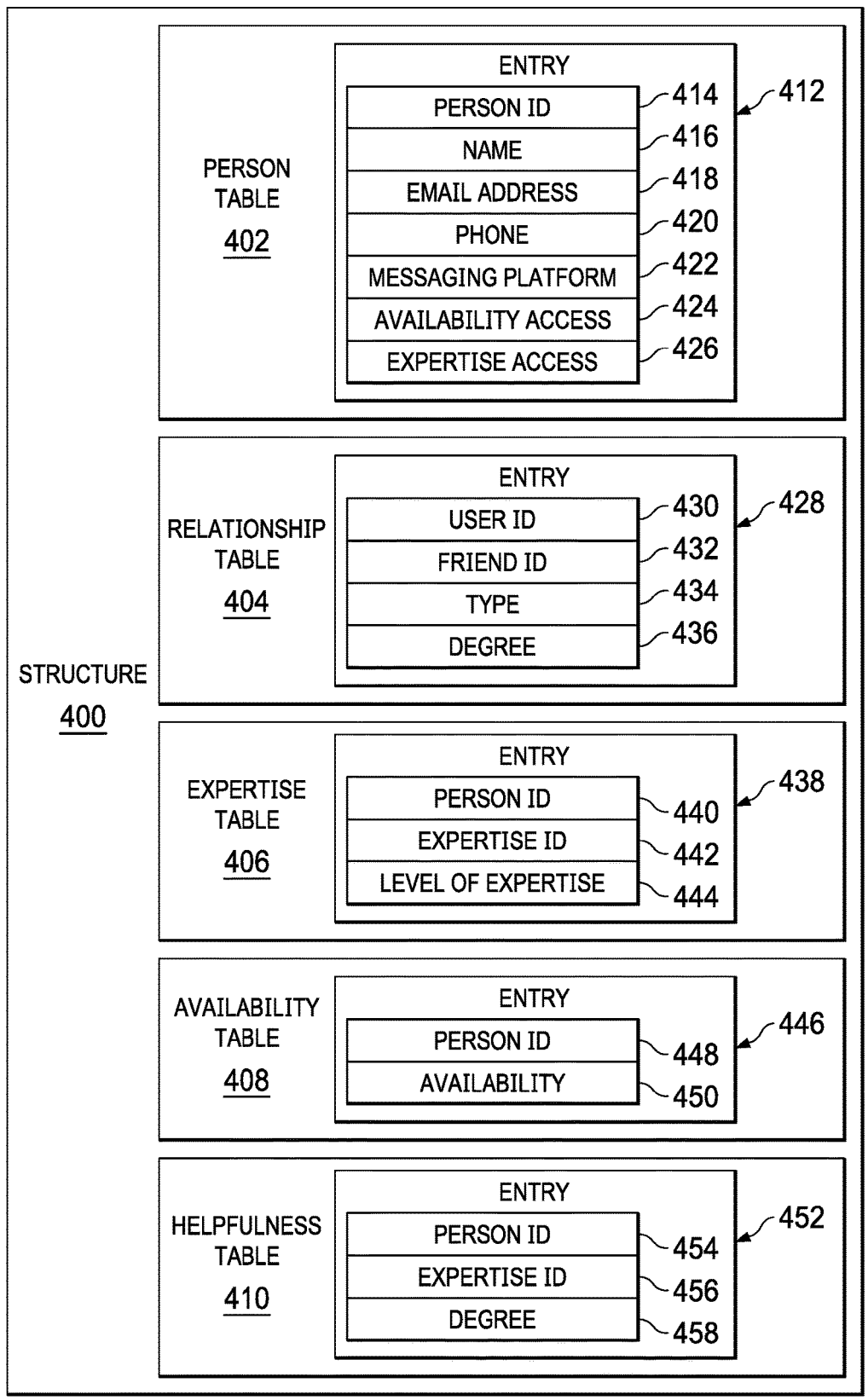
FIG. 4 is an illustration of a structure for an expert database in accordance with an illustrative embodiment.

Turning to FIG. 4, an illustration of a structure for an expert database is depicted in accordance with an illustrative embodiment. In FIG. 4, an example of one manner in which expert database 231 in FIG. 2 can be implemented is shown. In this example, structure 400 for expert database 231 includes person table 402, relationship table 404, expertise table 406, availability table 408, and helpfulness table 410.

As depicted, person table 402 stores person identification information about people which are referenced by other tables in expert database 231. In this example, person table 402 contains information about people such as user 202 and friends 228 of user 202. Friends 228 are experts for user 202 for topics 204. A person in person table 402 can be both a user and an expert.

Entry 412 is an example of an entry in person table 402. For example, entry 412 includes the following fields: person ID 414, name 416, email address 418, phone 420, messaging platform 422, availability access 424, and expertise access 426.

Person ID 414 is a unique identifier identifying entry 412 for a particular person, which may be a user or a friend. Name 416 is the name of the person in entry 412.

In this example, phone 420 is the number at which the person may be reached. Email address 418 is for the person. Messaging platform 422 identifies a program, service, or other mechanism for sending messages to the person. Messaging platform 422 can a messaging system such as an instant messaging service used by the person.

Availability access 424 controls who can see the availability information about the person. Expertise access 426 controls who can see expertise information about the person. These settings can also be used to control at least one of who can contact a person or what in manner a person can be contacted. The access settings for availability access 424 and expertise access 426 can be implemented using various currently available mechanisms.

For example, these access settings can implement concepts used to control at least one of who can see information or who can contact a person. These concepts include defining who can see information based on public, groups, and specific users who the expert will allow to view or contact. The defaults for the settings can be based on a policy that can be set by at least one of the company, a country, a standards committee, or some other suitable organization.

In the illustrative example, relationship table 404 is used to match users who are looking for information on topics to friends who are experts on the topics. As depicted, entry 428 is an example of an entry in relationship table 404. This table identifies which friends are available to particular users who search for information on different topics. For example, relationship table 404 stores relationship information about relationships between user 202 and friends 228, as well as for other users and their friends. As depicted, entry 428 includes the following fields: user ID 430, friend ID 432, type 434, and degree 436.

User ID 430 is an identifier for a person who is a user that performs searches for information on different topics. User ID 430 can be used to identify an entry in person table 402. User ID 430 may be used to locate the person with person ID 414 that matches user ID 430. Friend ID 432 is a person identifier used to locate a person in person table 402. Friend ID 432 is a friend of the person identified by user ID 430 and can be an expert on different topics.

Type 434 identifies the type of relationship between the person identified by user ID 430 and the person identified by friend ID 432. Type 434 may include at least one of a friend, a colleague, a co-worker, an acquaintance, or some other type of relationship.

As depicted, degree 436 indicates the strength of the relationship. Degree 436 can be calculated based on a number of interactions. Machine learning in an artificial intelligence system can be used to analyze the interactions themselves to identify the closeness of the two people. As another example, degree 436 can be, for example, user defined and can be based on input on or both of the people identified in entry 438.

In this particular example, expertise table 406 stores the topics and levels of expertise of friends identified for different users. Entry 438 is an example of an entry in expertise table 406. As depicted, entry 438 includes person ID 440, expertise ID 442, and level of expertise 444.

Person ID 440 identifies a person who is an expert in person table 402. Expertise ID 442 identifies a topic in which the person is an expert. In this illustrative example, multiple entries may be present for the same person to identify different topics in which the person is an expert. For example, expertise ID 442 may be a topic such as computer programming, computer malware, semiconductor design, plumbing, woodworking, automotive modifications, aerobic exercise, swimming, pastries, or other suitable topics. Expertise ID 442 can be a number or key that refers to the topic or can be the name of the topic.

In this illustrative example, level of expertise 444 can be at least one of expertise or depth of expertise. Depth of expertise may be identified using an artificial intelligence system with a cognitive component that detects depth, which would likely uncover relationships between certain words that are surrounded by the area of expertise. For example, an artificial intelligence system can determine that an expertise in "computer malware" has greater depth if the person uses more varied and domain specific terminology across writings such as "virus," "trojan," "adware," "rootkit," "ransomware," or other similar terms as opposed to more commonly used terms like referring to all computer malware as "virus," "malware," or any other term that at times have been used as a catchall.

In this illustrative example, availability table 408 is an example of another table that may be in structure 400. Availability table 408 stores availability information for friends. For example, the availability information can include at least one of a schedule, a calendar, or other suitable types of information. For example, availability table 408 can store information about when friends may be available to consult on topics of interest to a user.

As depicted, entry 446 is an example of an entry in availability table 408. Entry 446 includes the following fields: person ID 448 and availability 450. Person ID 448 is identifier that may be used to locate a person in person table 402.

Availability 450 indicates when the person is available. For example, availability 450 indicates the date and time ranges when a person is available. Availability 450 also may indicate how long a person takes to respond to a request for information. Availability 450 may be derived from various status and schedule sources. In other illustrative examples, available table 408 may be an option table with availability information being obtained as queries are received and friends of a user are identified as experts.

In another illustrative example, a personality profile from a personality test can be used to determine helpfulness. For example, utilizing a "Type A and Type B personality theory" personality test, a friend with a Type A personality may be more quickly available than a friend with a Type B personality. Machine learning in an artificial intelligence system can be used to analyze the correlation of personality profiles and helpfulness.

As depicted, helpfulness table 410 provides information about the likelihood that a person will respond or provide help if the person is available. As depicted, entry 452 is an example of an entry in helpfulness table 410. Entry 452 includes the following fields: person ID 454, expertise ID 456, and degree 458. Multiple entries may be present for the same person ID for different expertise. The same person may be more helpful or willing to respond for some topics as compared to other topics.

Person ID 454 is an identifier used to identify a person in person table 402. Expertise ID 456 is used identify a topic of expertise and may be used to identify a person in expertise table 406 with an expertise in the topic of interest.

Degree 458 indicates the degree of helpfulness that the person will be for the particular topic identified by expertise ID 456. The indication of helpfulness in degree 458 can have different granularity. For example, degree 458 can be based on at least one of expertise type, relationship type, specific requester, or other factors.

For example, a "friend" identified in expert database 231 may be very helpful to users who are calling colleagues but not helpful at all to users who are friends. The degree of helpfulness can be based on at least one of feedback from users, parsing interactions between the person and other people in other systems, or using other sources that can indicate the helpfulness of the person identified as an expert. For example, answers on technical forums that are rated as helpful may be used to indicate how helpful the person may be if asked for information about a particular topic.

The illustration of search environment 200 and the different components in FIGS. 2-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, client device 210 is depicted as sending query 206 to search system 212 over network 214. As depicted, network 214 is shown as a separate component from Internet 220. In this illustrative example, network 214 may be part of or may include Internet 220 even though these elements are shown as separate components. In yet another example, query 206 may contain one or more topics in addition to topic 226. These topics can be processed in the same manner as topic 226.

The set of search engines 218 is shown to be located outside of computer system 224. In another illustrative example, the set of search engines 218 can be implemented in one or more data processing systems within computer system 224.

In some illustrative examples, expert database 231 can omit one or more tables, include additional tables, or some combination thereof. For example, availability table 408 and helpfulness table 410 can be omitted.

For example, the different entries illustrated in structure 400 may include fields in addition to or in place of the ones depicted. For example, entry 412 may include one or more email addresses in addition to email address 418. In another illustrative example, one or more fields may be omitted from entry 412. For example, at least one of availability access 424 or expertise access 426 may be omitted. As another example, structure 400 may include a backing table to provide additional support for information in expertise table 406. In other illustrative examples, these backing tables may include information identifying sources of where the expertise is collected from, such as social networks, technical forums, blogs, or other suitable sources that are indicative of expertise for different topics.

Figure 5:
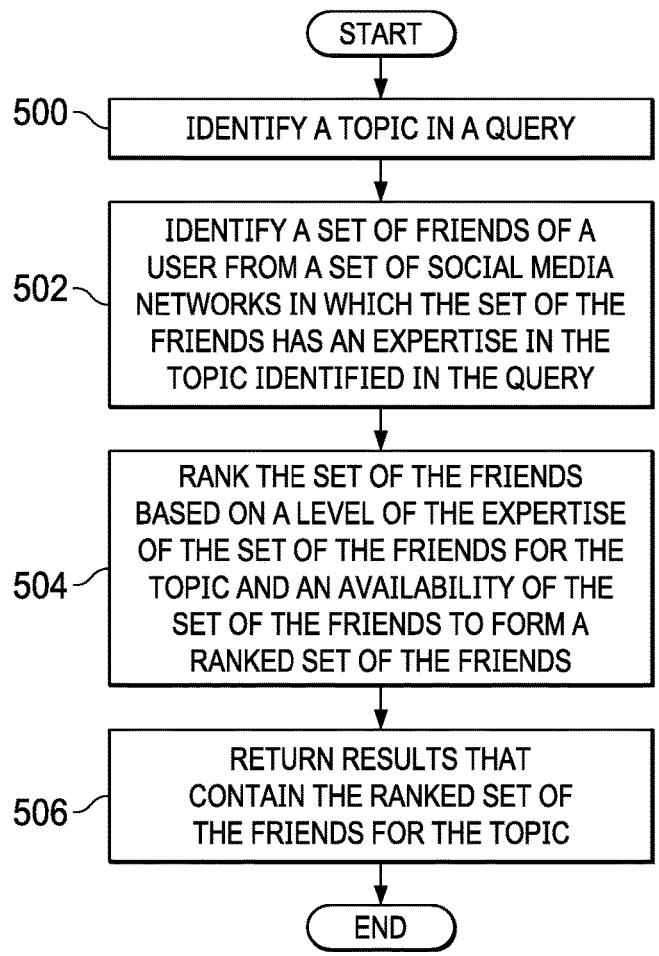
FIG. 5 is a flowchart of a process for processing a query received through a network in accordance with an illustrative embodiment.

Turning next to FIG. 5, a flowchart of a process for processing a query received through a network is depicted in accordance with an illustrative embodiment. The processes in FIG. 5 can be implemented in hardware, software, or both. When implemented in software, the processes can take the form of program code that is run by one of more processor units located in one or more hardware devices in one or more computer systems. For example, these processes can be implemented in expert identifier 222 running on computer system 224 in FIG. 2.

The process begins by identifying a topic in a query (step 500). In one illustrative example, the topic in the query can be identified using an artificial intelligence system that includes natural language processing.

The process identifies a set of friends of a user from a set of social media networks in which the set of the friends has an expertise in the topic identified in the query (step 502). The process ranks the set of the friends based on a level of the expertise of the set of the friends for the topic and an availability of the set of the friends to form a ranked set of the friends (step 504). The process returns results that contain the ranked set of the friends for the topic (step 506). The process terminates thereafter.

Figure 6:
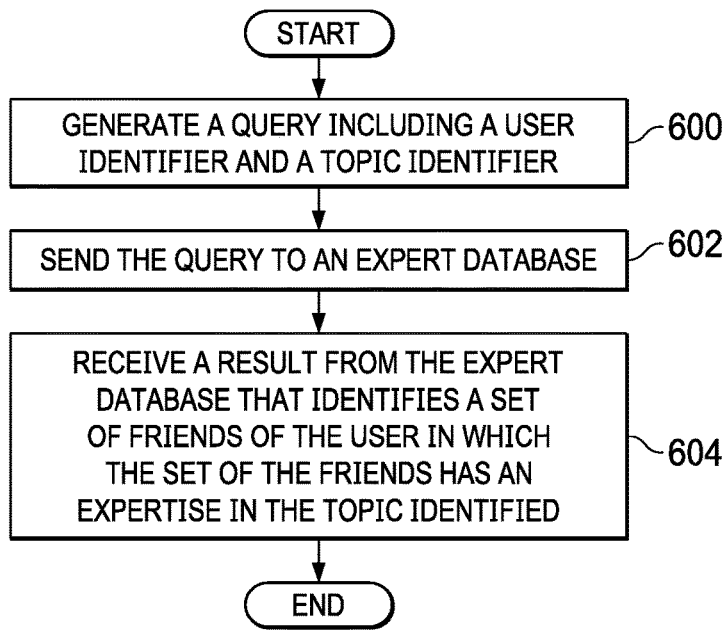
FIG. 6 is a flowchart of a process for identifying a set of friends in accordance with an illustrative embodiment.

With reference now for FIG. 6, a flowchart of a process for identifying a set of friends is depicted in accordance with an illustrative embodiment. The process in FIG. 6 is an example of one implementation for step 502 in FIG. 5.

The process generates a query including a user identifier and a topic identifier (step 600). The process sends the query to an expert database (step 602). The expert database includes friends of the user, topics of expertise for the friends, and levels of expertise of the friends for the topics. The expert database may also include information identifying friends, topics of expertise for the friends, and the levels of expertise of the friends for other users.

A result is received from the expert database that identifies a set of friends of the user in which the set of the friends has an expertise in the topic identified (step 604). The process terminates thereafter.

Figure 7:
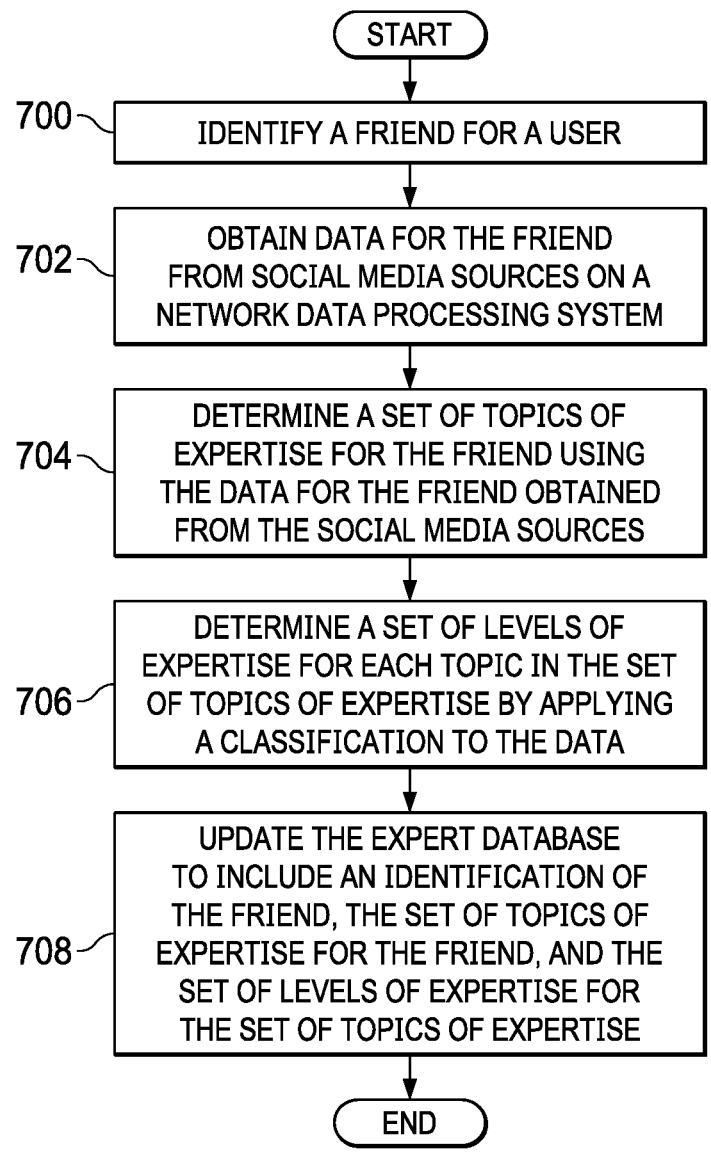
FIG. 7 is a flowchart of a process for identifying a friend for addition to an expert database in accordance with an illustrative embodiment.

With reference next to FIG. 7, a flowchart of a process for identifying a friend for addition to an expert database is depicted in accordance with an illustrative embodiment. The process in FIG. 7 can be implemented in hardware, software, or both. When implemented in software, the processes can take the form of program code that is run by one of more processor units located in one or more hardware devices in one or more computer systems. For example, these processes can be implemented in expert identifier 222 running on computer system 224 in FIG. 2.

The process begins by identifying a friend for a user (step 700). In step 700, the friend is one that is not already present in the expert database. The friend can be identified in a number of different ways in step 700.

For example, the friend can be identified from social media sources used by the user. The social media sources include at least one of an online social networking website, a professional networking website, an instant messaging service, or other types of social media sources. In the illustrative example, the user may provide access to contacts in social media networks to which the user belongs.

The process obtains data for the friend from social media sources on a network data processing system (step 702). For example, the process can initiate searches on the Internet. The process can also use web crawlers, spiders, or other mechanisms available to search for data about the friend.

The process determines a set of topics of expertise for the friend using the data for the friend obtained from the social media sources (step 704). The process also determines a set of levels of expertise for each topic in the set of topics of expertise by applying a classification to the data (step 706). The process updates the expert database to include an identification of the friend, a set of topics of expertise for the friend, and the set of levels of expertise for the set of topics of expertise (step 708). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 8:
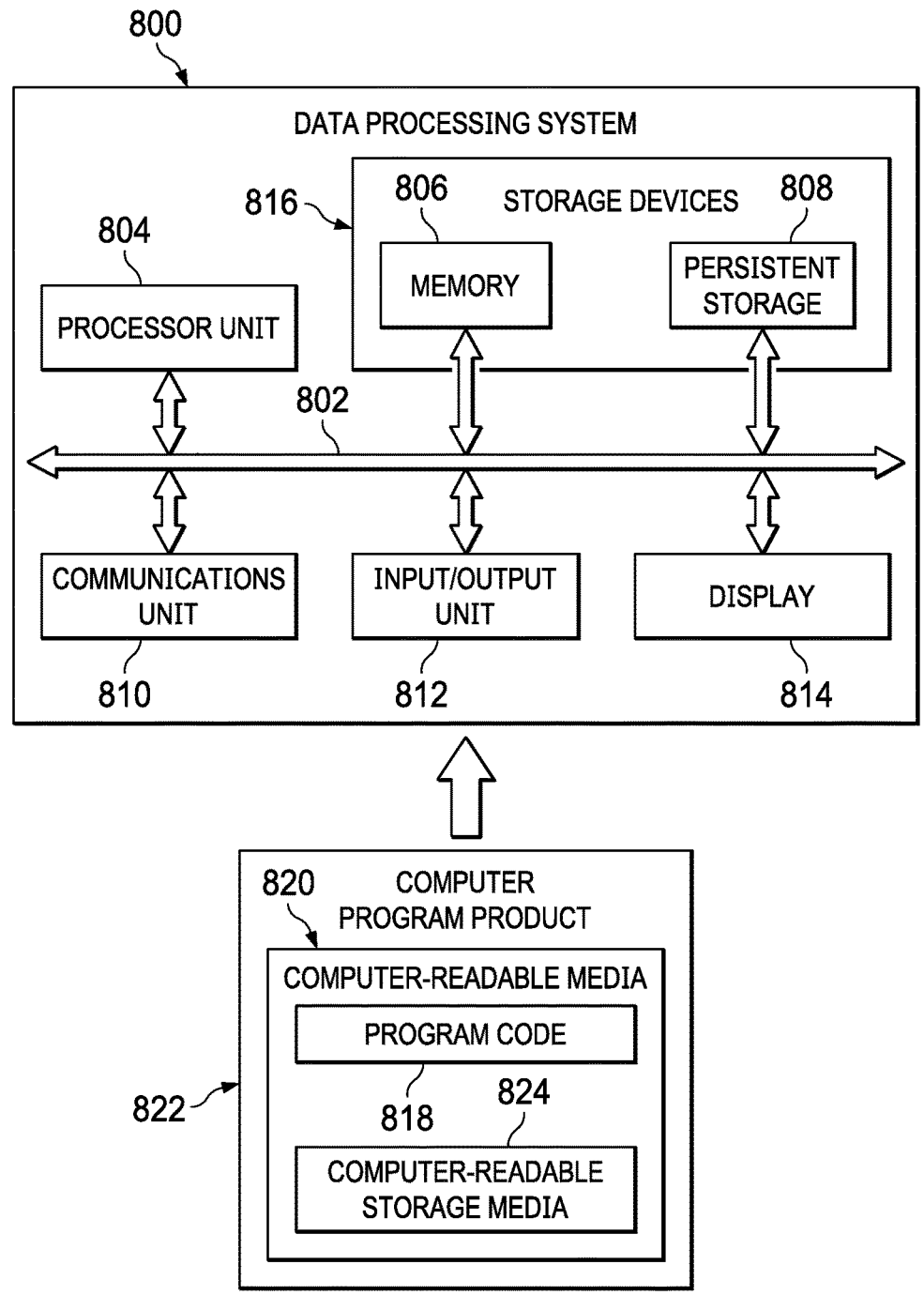
FIG. 8 is a block diagram of a data processing system in accordance with an illustrative embodiment.

Turning now to FIG. 8, a block diagram of a data processing system is depicted in accordance with an illustrative embodiment. Data processing system 800 may be used to implement server computer 104, server computer 106, and client devices 110 in FIG. 1, and computer system 224 in FIG. 2. In this illustrative example, data processing system 800 includes communications framework 802, which provides communications between processor unit 804, memory 806, persistent storage 808, communications unit 810, input/output unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, may be, for example, a random-access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a solid-state drive (SSD), a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer usable program code, or computer-readable program code that may be read and executed by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these illustrative examples. In the illustrative example, computer-readable media 820 is computer-readable storage media 824. In these illustrative examples, computer-readable storage media 824 is a physical or tangible storage device used to store program code 818 rather than a medium that propagates or transmits program code 818.

Alternatively, program code 818 may be transferred to data processing system 800 using a computer-readable signal media. The computer-readable signal media may be, for example, a propagated data signal containing program code 818. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

Thus, the illustrative embodiments provide a method, an apparatus, a system, and a computer program product for processing a query received through a network. In one illustrative example, a computer system identifies a topic in the query. The computer system identifies a set of friends of a user from a set of social media networks in which the set of the friends have an expertise in the topic identified in the query. The computer system ranks the set of the friends based on a level of the expertise of the set of the friends for the topic and an availability of the set of the friends. The computer system returns results that contain a ranked set of the friends for the topic.

One or more illustrative examples provide a solution to a technical problem in which search results may be at least one of more numerous or less relevant than desired when a user sends a query to obtain information on a topic of interest. One or more illustrative examples provide a technical solution in which friends of a user who are experts on the topic can be identified by an expert identifier and returned to the user in response to receiving the query. By providing suggestions of friends who are experts on the topic, the expert identifier enables reducing at least one of a number of search results or less relevant search results that a user may have to review to obtain information on a topic.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for processing a query received through a network, the method comprising:
    identifying, by a computer system, a topic in the query;
    identifying, by the computer system, a set of friends of a user from a set of social media networks in which the set of friends have an expertise in the topic identified in the query using an expert database in the computer system that identifies the set of friends of the user from the set of the social media networks, topics of expertise for the set of friends, and levels of expertise of the set of friends for the topics of expertise, wherein the expert database comprises a helpfulness table that identifies a likelihood the set of friends will respond to a request for information about the topic identified in the query based on an artificial intelligence system analyzing correlation of personality profiles from personality tests of the set of friends and helpfulness;
    ranking, by the computer system, the set of friends based on a level of the expertise of the set of friends for the topic and an availability of the set of friends to form a ranked set of friends;
    returning, by the computer system, results that contain the ranked set of friends for the topic;
    receiving, by the computer system, search results from a set of search engines for the query; and
    wherein returning, by the computer system, the results that contain the ranked set of friends comprises:
    returning, by the computer system, the results that contain the ranked set of friends and the search results, wherein the expert database further comprises:
    a person table that stores (i) person identification information about the user and the set of friends and (ii)

expertise access information that controls who can see expertise information about the set of friends;

a relationship table that stores relationship information about relationships between the user and the set of friends based on the artificial intelligence system analyzing interactions themselves between the user and the set of friends to identify closeness of the user to each of the set of friends;

an expertise table that stores the topics of expertise and the levels of expertise for each of the set of friends based on the artificial intelligence system detecting a level of expertise of each respective friend for one or more topics by uncovering relationships between certain words used by each respective friend surrounding the one or more topics of expertise; and an availability table that stores availability information for the set of friends based on the artificial intelligence system determining how soon the information about the topic identified in the query is needed by analyzing wording of the query to determine a time frame for when information about the topic is needed.

2. The method of claim 1, wherein identifying, by the computer system, the topic in the query comprises:
identifying, by the computer system, the topic in the query using the artificial intelligence system that includes natural language processing.

3. The method of claim 1 further comprising:
identifying a friend for the user;
obtaining data for the friend from social media sources on a network data processing system;
determining a set of the topics of expertise for the friend using the data for the friend obtained from the social media sources;
determining a set of the levels of expertise for each topic in the set of the topics of expertise by applying a classification to the data; and
updating the expert database to include an identification of the friend, the set of the topics of expertise for the friend, and the set of the levels of expertise for the set of the topics of expertise.

4. A search augmentation system comprising:
a hardware computer system; and
an expert identifier running on the computer system, wherein the expert identifier identifies a topic in a query; identifies a set of friends of a user from a set of social media networks in which the set of friends have an expertise in the topic identified in the query using an expert database in the computer system that identifies the set of friends of the user from the set of the social media networks, topics of expertise for the set of friends, and levels of expertise of the set of friends for the topics of expertise, wherein the expert database comprises a helpfulness table that identifies a likelihood the set of friends will respond to a request for information about the topic identified in the query based on an artificial intelligence system analyzing correlation of personality profiles from personality tests of the set of friends and helpfulness; ranks the set of friends based on a level of the expertise of the set of friends for the topic and an availability of the set of friends to form a ranked set of friends; and returns results that contain the ranked set of friends for the topic, wherein the expert identifier receives search results from a set of search engines for the query; and wherein in returning the results, the expert identifier returns the results that contain the ranked set of friends and the search results, wherein the expert database further comprises:

a person table that stores (i) person identification information about the user and the set of friends and (ii) expertise access information that controls who can see expertise information about the set of friends;

a relationship table that stores relationship information about relationships between the user and the set of friends based on the artificial intelligence system analyzing interactions themselves between the user and the set of friends to identify closeness of the user to each of the set of friends;

an expertise table that stores the topics of expertise and the levels of expertise for each of the set of friends based on the artificial intelligence system detecting a level of expertise of each respective friend for one or more topics by uncovering relationships between certain words used by each respective friend surrounding the one or more topics of expertise; and an availability table that stores availability information for the set of friends based on the artificial intelligence system determining how soon the information about the topic identified in the query is needed by analyzing wording of the query to determine a time frame for when information about the topic is needed.

5. The search augmentation system of claim 4, wherein in identifying the topic in the query, the expert identifier identifies the topic in the query using the artificial intelligence system that includes natural language processing.

6. The search augmentation system of claim 4, wherein the expert identifier identifies a friend for the user; obtains data for the friend from social media sources on a network data processing system; determines a set of the topics of expertise for the friend using the data for the friend obtained from the social media sources; determines a set of the levels of expertise for each topic in the set of the topics of expertise by applying a classification to the data; and updates the expert database to include an identification of the friend, the set of the topics of expertise for the friend, and the set of the levels of expertise for the set of the topics of expertise.

7. A computer program product for processing a query received through a network, the computer program product comprising:
a computer-readable storage media;
first program code, stored on the computer-readable storage media, for identifying a topic in the query;
second program code, stored on the computer-readable storage media, for identifying a set of friends of a user from a set of social media networks in which the set of friends have an expertise in the topic identified in the query using an expert database that identifies the set of friends of the user from the set of the social media networks, topics of expertise for the set of friends, and levels of expertise of the set of friends for the topics of expertise, wherein the expert database comprises a helpfulness table that identifies a likelihood the set of friends will respond to a request for information about the topic identified in the query based on an artificial intelligence system analyzing correlation of personality profiles from personality tests of the set of friends and helpfulness;
third program code, stored on the computer-readable storage media, for ranking the set of friends based on a level of the expertise of the set of friends for the topic and an availability of the set of friends to form a ranked set of friends;

fourth program code, stored on the computer-readable storage media, for returning results that contain the ranked set of friends for the topic; and fifth program code, stored on the computer-readable storage media, for receiving search results from a set of search engines for the query; and wherein the fourth program code comprises:

program code, stored on the computer-readable storage media, for returning the results that contain the ranked set of friends and the search results, wherein the expert database further comprises:

a person table that stores (i) person identification information about the user and the set of friends and (ii) expertise access information that controls who can see expertise information about the set of friends;

a relationship table that stores relationship information about relationships between the user and the set of friends based on the artificial intelligence system analyzing interactions themselves between the user and the set of friends to identify closeness of the user to each of the set of friends;

an expertise table that stores the topics of expertise and the levels of expertise for each of the set of friends based on the artificial intelligence system detecting a level of expertise of each respective friend for one or more topics by uncovering relationships between certain words used by each respective friend surrounding the one or more topics of expertise; and an availability table that stores availability information for the set of friends based on the artificial intelligence system determining how soon the information about the topic identified in the query is needed by analyzing wording of the query to determine a time frame for when information about the topic is needed.

8. The computer program product of claim 7, wherein the expert database further comprises:

an availability table that stores availability information for the set of friends based on the artificial intelligence system determining how soon the information about the topic identified in the query is needed by analyzing wording of the query.

9. The computer program product of claim 7, wherein the second program code comprises:

program code, stored on the computer-readable storage media, for identifying the topic in the query using the artificial intelligence system that includes natural language processing.

10. The computer program product of claim 7 further comprising:

program code, stored on the computer-readable storage media, for identifying a friend for the user;

program code, stored on the computer-readable storage media, for obtaining data for the friend from social media sources on a network data processing system;

program code, stored on the computer-readable storage media, for determining a set of the topics of expertise for the friend using the data for the friend obtained from the social media sources;

program code, stored on the computer-readable storage media, for determining a set of the levels of expertise for each topic in the set of the topics of expertise by applying a classification to the data; and program code, stored on the computer-readable storage media, for updating the expert database to include an identification of the friend, the set of the topics of expertise for the friend, and the set of the levels of expertise for the set of the topics of expertise.

* * * * *